United States Patent
Lott

(10) Patent No.: US 7,925,886 B2
(45) Date of Patent: Apr. 12, 2011

(54) ENCRYPTION OUTPUT DATA GENERATION METHOD AND SYSTEM

(75) Inventor: David Robert Lott, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 972 days.

(21) Appl. No.: 11/762,125

(22) Filed: Jun. 13, 2007

(65) Prior Publication Data

US 2008/0310631 A1 Dec. 18, 2008

(51) Int. Cl.
*H04L 9/32* (2006.01)
(52) U.S. Cl. ......... 713/180; 713/189; 380/255; 380/269
(58) Field of Classification Search .................. 713/189
See application file for complete search history.

(56) References Cited

U.S. PATENT DOCUMENTS

| | | | |
|---|---|---|---|
| 5,666,415 A * | 9/1997 | Kaufman | ............... 713/159 |
| 6,064,736 A | 5/2000 | Davis et al. | |
| 6,374,250 B2 | 4/2002 | Ajtai et al. | |
| 6,434,662 B1 | 8/2002 | Greene et al. | |
| 6,826,686 B1 | 11/2004 | Peyravian et al. | |
| 2002/0029341 A1 | 3/2002 | Juels et al. | |
| 2003/0023846 A1 | 1/2003 | Krishna et al. | |
| 2005/0097348 A1 | 5/2005 | Jakubowski et al. | |
| 2006/0053288 A1 | 3/2006 | Stern et al. | |

* cited by examiner

*Primary Examiner* — Ponnoreay Pich
(74) *Attorney, Agent, or Firm* — Schmeiser, Olsen & Watts; William E. Schiesser

(57) ABSTRACT

A hashing method and system. The method comprises receiving by a computing system first source data. A first hash function is applied to first source data. A first hash output is generated by the first hash function as a result of applying the first hash function to first source data. The computing system performs an operation relating the first source data with at least a portion of the first hash output to generate second source data. The first hash function is applied to the second source data. A second hash output is generated as a result of applying the first hash function to the second source data.

28 Claims, 3 Drawing Sheets

ENCRYPTION OUTPUT DATA GENERATION METHOD AND SYSTEM

FIELD OF THE INVENTION

The present invention relates to a method and associated system for generating hash outputs.

BACKGROUND OF THE INVENTION

Methods for preventing identical encrypted output data from being generated from distinct input data are typically not very reliable. Encryption methods may produce identical output data from different input data. The identical output data may cause various users to access private and secure data and/or accounts. Accessing private and secure data and/or accounts may cause a breach in secure systems such as financial or medical records data banks. Accordingly, there exists a need in the art to overcome the deficiencies and limitations described herein above.

SUMMARY OF THE INVENTION

The present invention provides a method, comprising:
receiving, by a computing system, first source data (S1);
first applying, by said computing system, a first hash function to said first source data (S1);
generating as a result of said first applying, by said first hash function, a first hash output (H1);
performing, by said computing system, an operation relating, said first source data (S1) with at least a portion of said first hash output (H1) to generate second source data (S2);
second applying, by said computing system, said first hash function to said second source data (S2); and
generating as a result of said second applying, by said first hash function, a second hash output (H2).

The present invention provides a computing system comprising a processor and a computer readable memory unit coupled to the processor, said memory unit containing instructions that when executed by the processor implement a hashing method, said method comprising:
receiving, by a computing system, first source data (S1);
first applying, by said computing system, a first hash function to said first source data (S1);
generating as a result of said first applying, by said first hash function, a first hash output (H1);
performing, by said computing system, an operation relating, said first source data (S1) with at least a portion of said first hash output (H1) to generate second source data (S2);
second applying, by said computing system, said first hash function to said second source data (S2); and
generating as a result of said second applying, by said first hash function, a second hash output (H2).

The present invention provides a computer program product, comprising a computer usable medium having a computer readable program code embodied therein, said computer readable program code comprising an algorithm adapted to implement a hashing method within a computing system, said method comprising:
receiving, by a computing system, first source data (S1);
first applying, by said computing system, a first hash function to said first source data (S1);
generating as a result of said first applying, by said first hash function, a first hash output (H1);
performing, by said computing system, an operation relating, said first source data (S1) with at least a portion of said first hash output (H1) to generate second source data (S2);
second applying, by said computing system, said first hash function to said second source data (S2); and
generating as a result of said second applying, by said first hash function, a second hash output (H2).

The present invention provides a process for integrating computing infrastructure, comprising integrating computer-readable code into a computing system, wherein the computing system comprises a computer usable medium, and wherein the code in combination with the computing system is capable of performing a hashing method comprising:
receiving, by a computing system, first source data (S1);
first applying, by said computing system, a first hash function to said first source data (S1);
generating as a result of said first applying, by said first hash function, a first hash output (H1);
performing, by said computing system, an operation relating, said first source data (S1) with at least a portion of said first hash output (H1) to generate second source data (S2);
second applying, by said computing system, said first hash function to said second source data (S2); and
generating as a result of said second applying, by said first hash function, a second hash output (H2).

The present invention advantageously provides a method for preventing identical encrypted output data from being generated from distinct input data.

DETAILED DESCRIPTION OF THE INVENTION

Figure 1:
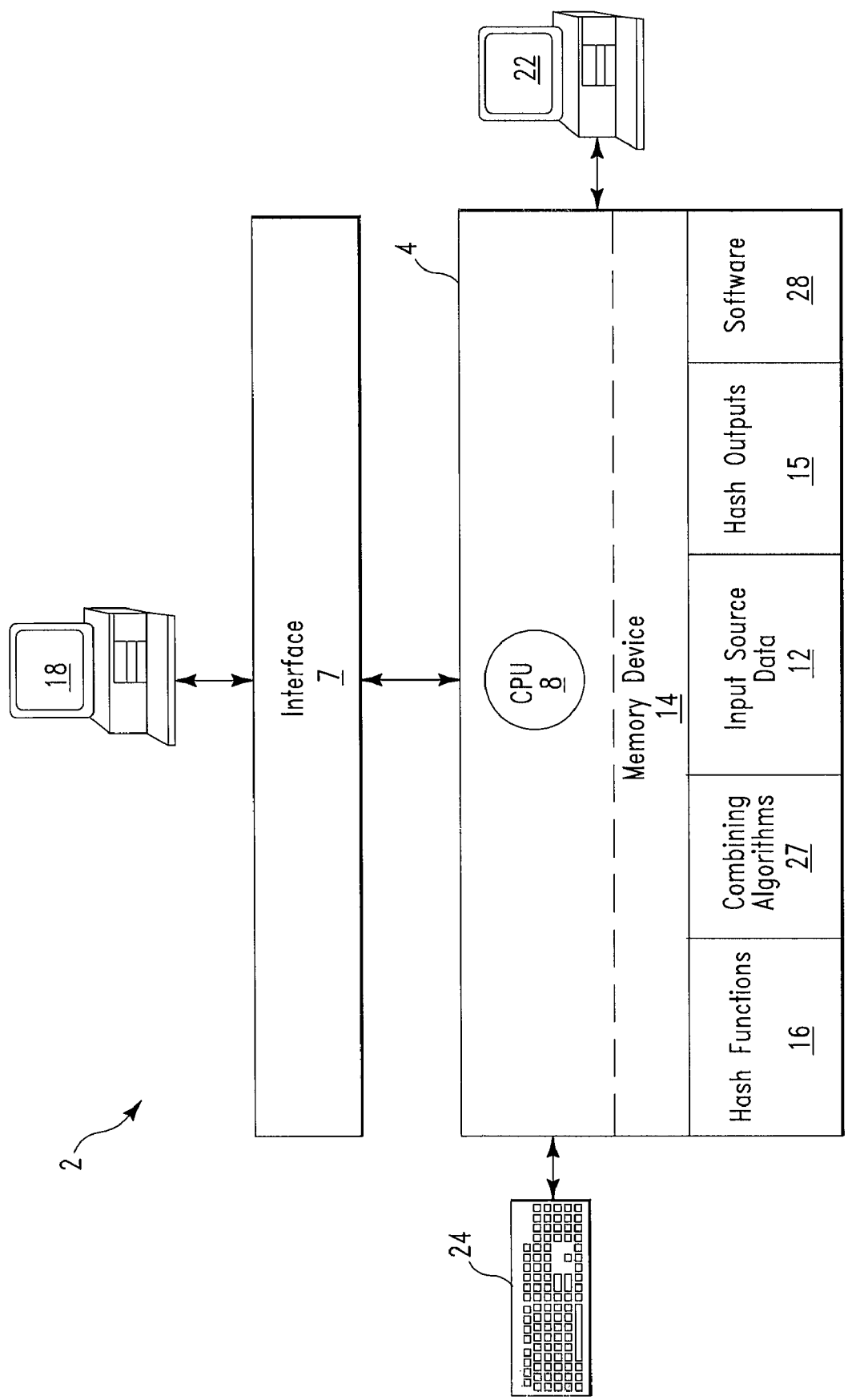
FIG. 1 illustrates a block diagram of a system for generating hash outputs from input source data, in accordance with embodiments of the present invention.

FIG. 1 illustrates a block diagram of a system 2 for generating hash outputs from input source data 12, in accordance with embodiments of the present invention. System 2 comprises computing system 4, an input terminal 18, an input terminal 22, a network 10, and an input means 24. Network 10 may comprise any type of network known to one skilled in the art including, inter alia, a local area network, (LAN), a wide area network (WAN), the Internet, etc. Input terminal 18 may comprise any type of computing apparatus including, inter alia, a personal computer (PC), a laptop computer, a personal digital assistant (PDA), etc. Input terminal 22 may comprise any type of computing apparatus including, inter alia, a personal computer (PC), a laptop computer, a PDA, etc. Input means 24 may comprise any type of input means including, inter alia, a keyboard a keypad, etc. Computing system 4 comprises a central processing unit (CPU) 8 and a memory device 14. The memory device 14 comprises hash functions 16 (i.e., hash algorithms), combining algorithms 27, input source data 12, software 28, and hash outputs 15. Input source data 12 may comprise private personal data (i.e., comprising any combination of alpha/numeric characters) related to users including, inter alia, passwords, credit card information, bank account information, email account information, email text, a text document, etc. Input source data 12 may be entered into computing system 4 using input terminal 18, input terminal 22, or input means 24. Combining algorithms 27 may comprise any type of algorithms for combining hash output values including, inter alia, an exclusive OR (XOR) algorithm, an appending algorithm, etc. A hash function (i.e., from hash functions 16) is defined herein as a cryptographic one way mathematical function that receives as an input, a variable length input data message or string (e.g., a user password) and generates as an output, a secure fixed size output message or string (i.e., a secure mathematical representation of the password called a hash output). The output message or string generated by the hash function is typically shorter than the variable length input data message or string. The variable length input may not be determined from the secure fixed size output message or string. Hash functions 16 may comprise, inter alia, cryptographic hash functions, etc. A cryptographic hash function is a hash function comprising additional (i.e., over a standard hash function) security properties making it suitable for use as a primitive in information security applications such as, inter alia, an authentication process, a message integrity process, etc. The hash function may be used for securing a user password to prohibit unauthorized access to private/personal data computing system 4 and data 12 within computing system 4. Hash functions 16 may comprise any type of hash functions known to one skilled in the art including, inter alia, SDH1, ND4, MD4, MD5, SHA1, RC4, etc. A hash function is applied to a hash input (e.g., a user password) to generate a hash output or value. A hash output is defined herein as an output resulting from applying a hash function to a hash input (i.e., input source data 12). Hash outputs 15 includes any files comprising hash outputs for input parameters such as, passwords, credit card information, bank account information, email account information, email text, a text document, etc.

System 2 reduces instances of hash output collisions. A hash output collision is defined herein as a situation that occurs when a hash function is applied to two distinct (different) inputs (i.e., discrete data) from input source data 12 and the hash function produces identical hash outputs from the two distinct inputs. Hash output collisions are undesirable in a security context because it is possible to fool a security measure (such as authentication) by providing an input that is different than a desired input (e.g., a password) and gain privileges or access that should not be granted.

In order to initialize a hashing process (i.e., a process to generate a hash output), software 28 in system 2 makes a call to a first hash function (i.e., from hash functions 16) in order to obtain a hash output (H1). A calling function from software 28 will provide a source data set (S1) from input source data 12 that the first hash function will be applied against. The source data set (S1) may comprise a short character string such as, inter alia, a password, etc. Alternatively, the source data set (S1) may comprise larger input data such a, inter alia, a data file, a stream of data, etc. System 2 will run the source data set S1 (from input source data 12) through the normal hashing function (i.e., apply a hash function to the source data set (S1)) to generate a hash output (H1). After the hash output (H1) is generated, a numerical value (N1) for a first byte in the hash output (H1) is determined. For example, if the generated hash output (H1) is: b7984f5, then a numerical value (N1) for a first byte (i.e., the first byte is "b") is 98. The numerical value (N1) for the letter "b" may be determined using an ASCII conversion. System 2 additionally determines a total number of bytes (N2) comprised by the source data set (S1) (i.e., used to generate the hash output (H1)). The total number of bytes (N2) is equivalent to a total number of characters comprised by the source data set (S1). A mathematical operation called a modulus is used to determine a remainder (R). A formula: N1 mod N2 is used to determine the remainder R. For example, if N1=98 and N2=10, then using the formula N1 mod N2 (98 mod 10), a remainder (R) of 8 is calculated (i.e., 98/10=9 with a remainder of 8). The hash output (H1) is then pre-pended with a number of zeros (N3) equal to a value of the remainder (R). As a first example, if R=8 and the hash output (H1) is: b7984f5, then the hash output (H1) is pre-pended with 8 zeros as follows: 00000000b7984f5. As a second example, if R=0 (i.e., N1=N2 or N1 is a multiple of N2) and the hash output (H1) is: b7984f5, then the hash output (H1) is not pre-pended with zeros (i.e., zero zeros). A total number of bytes (N4) comprised by the hash output (H1) and N3 (i.e., a combined number of bytes) is compared to the total number of bytes (N2) comprised by the source data set (S1). If the total number of bytes (N4) is greater than the total number of bytes (N2), then the hash output (H1) comprising the zeros is truncated (i.e., a size of the hash output (H1) comprising the zeros is reduced) to comprise a same number of bytes as the total number of bytes (N2) comprised by the source data set (S1) as described, infra. If the total number of bytes (N4) is less than or equal to the total number of bytes (N2), then no change (i.e., size reduction) is required. The source data set (S1) is now combined with the truncated hash output (H1) comprising the zeros using one of combining algorithms 27.

A first example for performing an operation relating (e.g., combining) the truncated hash output (H1) comprising the zeros to the source data set (S1) and generating combined value is described as follows:

The hash output H1 and the source data set (S1) are combined by applying an XOR operation (i.e., algorithm or logic) to the first hash output H1 and the source data set (S1) to generate a computed XOR value H1 XOR S1 for the hash output H1 and the source data set (S1) (i.e., using an XOR algorithm or logic wherein the hash output H1 and the source data set S1 are inputs to the XOR algorithm or logic and the combination value H1 XOR S1 is an output from the XOR algorithm or logic).

A second example for performing an operation relating (e.g., combining) the truncated hash output (H1) comprising the zeros to the source data set (S1) and generating combined value is described as follows:

The hash output H1 and the source data set (S1) are combined by appending (i.e., concatenating) the first hash output H1 to the source data set (S1) to generate a combined value H1S1 or S1H1 for the first hash H1 and the source data set (S1) (i.e., using an appending algorithm wherein the first hash H1 and the source data set (S1) are inputs to the appending algorithm and the first combination value H1S1 or S1H1 is an output from the appending algorithm).

The first hash function (i.e., used to generate the hash output H1) will be applied to the combined value for H1 and S1 (e.g., H1 XOR S1, H1S1, S1H1, etc) to generate a new hash output (H2) that reduces any instances of hash output collisions.

An example for implementation of system 2 (of FIG. 1) to generate and store a secure hash output (e.g., hash output H2) is described as follows:

1. Software 28 makes a call to a first hash function (i.e., from hash functions 16) in order to obtain a hash output (H1).
2. A calling function from software 28 will provide a source data set (S1) from input source data 12 that the first hash function will be applied against. The source data set in this example is:
   "Preshared_password_key"
3. System 2 will apply the first hash function (i.e., in this example the first hash function comprises an MD5 sums hash function) to the source data set:
   "Preshared_password_key"
A hash output is generated by the first hash function as follows:
   b53f48dbaa98ddd4d779b8b42bc93381

4. The next step is to determine a value for the first byte in the hash output. The first byte in the hash output is a "b" comprising an ASCI value of 98.

5. The next step is to determine a total number of bytes in the source data set (Preshared_password_key). The total number of bytes in the source data set (Preshared_password_key) is 22.

6. A modulus is used to determine a remainder (R) as follows:

98 mod 22=a remainder of 10

7. The hash output b53f48dbaa98ddd4d779b8b42bc93381 generated in step 3 is pre-pended with a number of zeros equal to the remainder (R). In the example the remainder R=10 so therefore a result is generated as follows:
0000000000b53f48dbaa98ddd4d779b8b42bc93381

8. It is determined that the result form step 7 comprises a greater number of bytes (i.e., 42) than the total number of bytes comprised by the source data set (i.e., 22) so therefore the result from step 7 is truncated to comprise a same size (i.e., a same number of bytes) as the source data set (i.e., 22) as illustrated below:
0000000000b53f48dbaa98

9. The source data set is combined with the result from step 8 as follows:
Preshared_password_key (XOR)0000000000b53f48dbaa98
Thereby producing a result of:
00000000: 50 72 65 73 68 61 72 65 64 5f 12 54 40 15 43 57

10. The result from step 9 is applied to the first hash function resulting in the following new hash output:
cbcabb45a95209e35878b5f36ee665bf The new hash output reduces any instances of hash output collisions.

Figure 2:
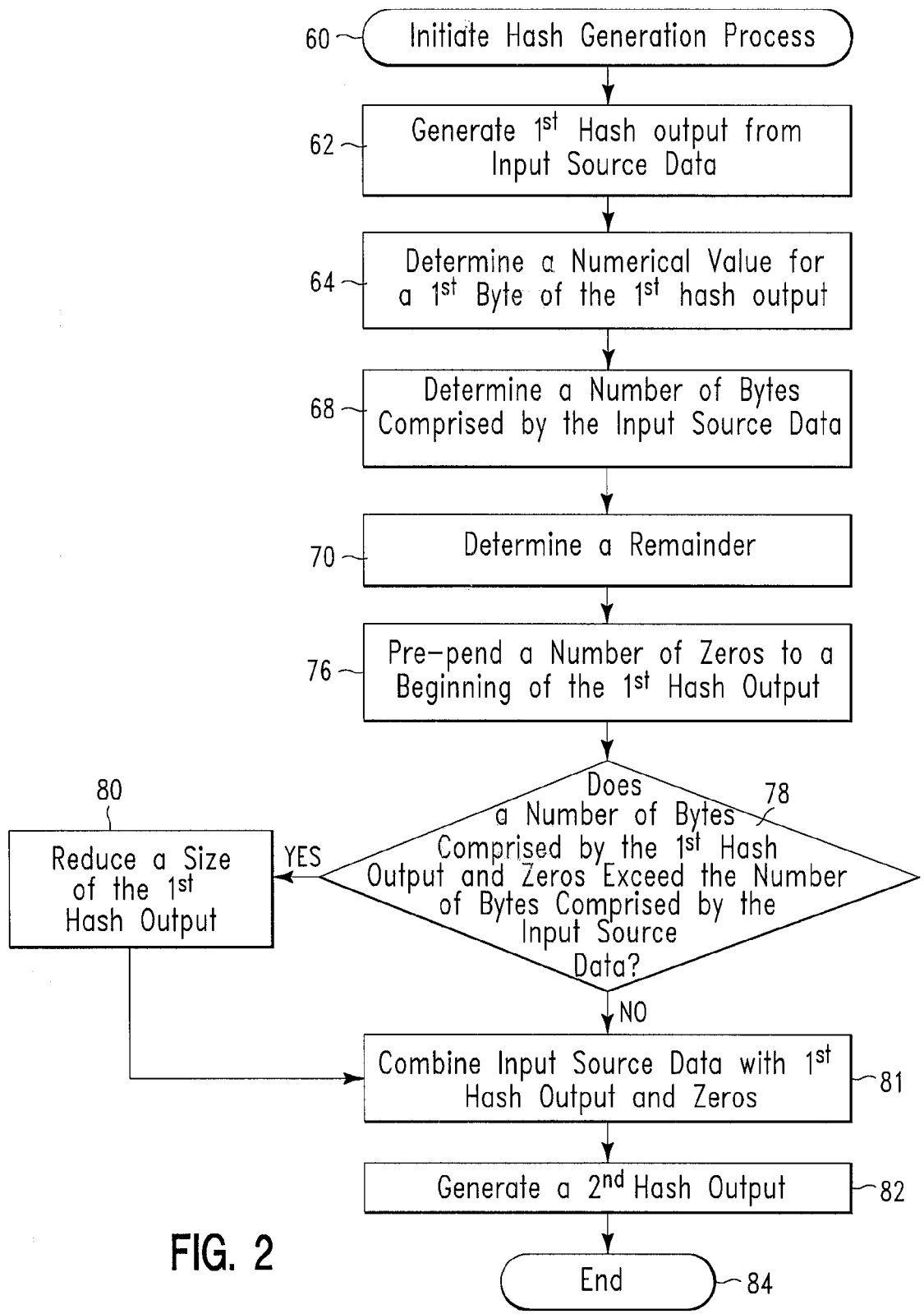
FIG. 2 illustrates a flowchart describing an algorithm used by the computing system of FIG. 1 for generating hash outputs from input source data, in accordance with embodiments of the present invention.

FIG. 2 illustrates a flowchart describing an algorithm used by computing system 4 of FIG. 1 for generating hash outputs from input source data 12, in accordance with embodiments of the present invention. In step 60, a hash output generation process is initiated. In step 62, computing system 4 of FIG. 1 will run a source data set S1 (from input source data 12) through a normal hashing function (i.e., apply a hash function to the source data set (S1)) to generate a hash output (H1). In step 64, a numerical value (N1) for a first byte in the hash output (H1) is determined. In step 68, computing system 4 determines a total number of bytes (N2) comprised by the source data set (S1) (i.e., used to generate the hash output (H1)). The total number of bytes (N2) is equivalent to a total number of characters comprised by the source data set (S1). In step 70 a mathematical operation called a modulus is used to determine a remainder (R). A formula: N1 mod N2 is used to determine the remainder R as described, supra, with respect to FIG. 1. In step 76, the hash output (H1) is pre-pended with a number of zeros (N3) equal to a value of the remainder (R) determined in step 70. In step 78, a total number of bytes (N4) comprised by the hash output (H1) and N3 (i.e., a combined number of bytes) is compared to the total number of bytes (N2) comprised by the source data set (S1) to determine if the total number of bytes (N4) comprised by the hash output (H1) and N3 (i.e., a combined number of bytes) greater than the total number of bytes (N2) comprised by the source data set (S1). If in step 78, it is determined that the total number of bytes (N4) is greater than the total number of bytes (N2), then in step 80, the hash output (H1) comprising the zeros is truncated (i.e., a size of the hash output (H1) comprising the zeros is reduced) to comprise a same number of bytes as the total number of bytes (N2) comprised by the source data set (S1) as described, supra, with respect to FIG. 1. If in step 78, it is determined that the total number of bytes (N4) is less than or equal to the total number of bytes (N2), then no change (i.e., size reduction) is required. In step 81, the source data set (S1) is combined (e.g., using an XOR function, an appending function, etc) with the hash output (H1) comprising the zeros from step 78 or step 80. In step 82, the first hash function (i.e., used to generate the hash output H1) will be applied to the combined value for H1 and S1 (e.g., H1 XOR S1, H1S1, S1H1, etc) generated in step 81 to generate a new hash output (H2) that reduces any instances of hash output collisions. In step 84, the process is terminated.

Figure 3:
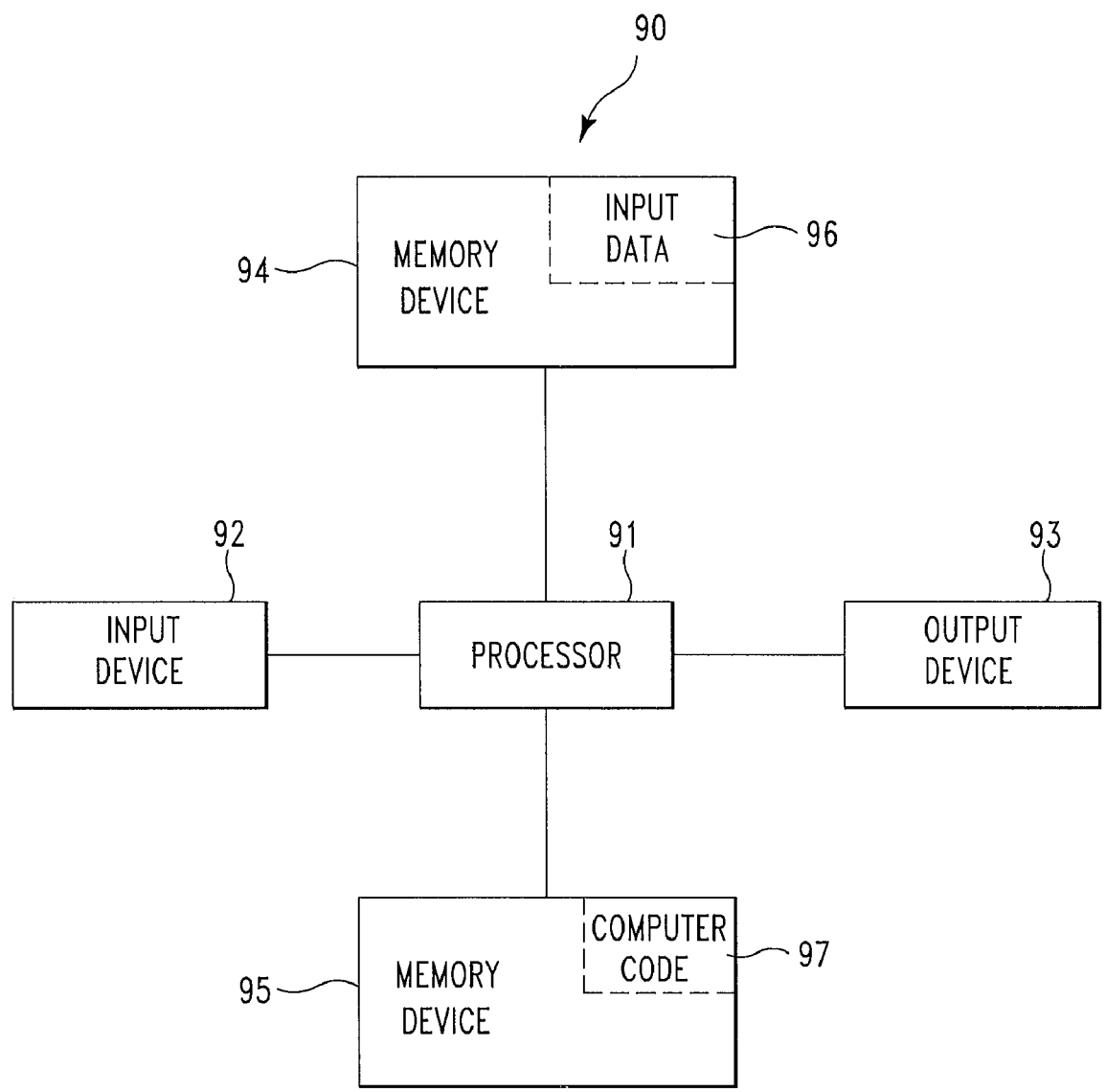
FIG. 3 illustrates a computer system used for implementing the computing system of FIG. 1 to generate hash outputs from input source data, in accordance with embodiments of the present invention.

FIG. 3 illustrates a computer system 90 (i.e., computing system 4 in FIG. 1) used for generating hash outputs from input source data 12, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm (e.g., algorithm of FIG. 2) for generating hash outputs from input source data 12. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers to provide a service for generating hash outputs from input source data 12. Thus the present invention discloses a process for deploying or integrating computing infrastructure, comprising integrating computer-readable code into the computer system 90, wherein the code in combination with the computer system 90 is capable of performing a method for generating hash outputs from input source data 12. In another embodiment, the invention provides a business method that performs the process steps of the invention on a subscription, advertising, and/or fee basis. That is, a service provider, such as a Solution Integrator, could offer to generate hash outputs from input source data 12. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method, comprising:
   receiving, by a computing system comprising a computer processor, first source data (S1);
   first applying, by said computing system, a first hash function to said first source data (S1);
   generating as a result of said first applying, by said first hash function, a first hash output (H1);
   performing, by said computing system, an operation relating, said first source data (S1) with at least a portion of said first hash output (H1) to generate second source data (S2);
   second applying, by said computing system, said first hash function to said second source data (S2); and
   generating as a result of said second applying, by said computer processor executing said first hash function, a second hash output (H2), wherein the second hash output (H2) is used to prevent unauthorized access to one or more computing systems including said computing system.

2. The method of claim 1, further comprising:
   determining a numerical value (N1) for a first byte of said first hash output (H1); and
   determining a total number (N2) of bytes in said first source data (S1).

3. The method of claim 2, further comprising:
   calculating, by said computing system, a remainder (R), wherein said remainder (R)=N1 mod N2.

4. The method of claim 3, further comprising:
   combining, by said computing system, said first hash output (H1) with a number (N3) of zeros equivalent to a value of said remainder (R) such that said first hash output (H1) comprises said zeros; and
   second comparing said total number (N2) of bytes of said first source data (S1) with a number (N4) of bytes comprised by said first hash output (H1) comprising said zeros to determine if said total number (N2) of bytes is greater than said number (N4) of bytes.

5. The method of claim 4, wherein said second comparing determines that said number (N4) of bytes is greater than said total number (N2) of bytes, and wherein said method further comprises:
   removing, by said computing system, at least one byte of said first hash output (H1) such that first hash output (H1) does not comprise said at least one byte of said first hash output (H1).

6. The method of claim 4, wherein said second comparing determines that said number (N4) of bytes is not greater than said total number (N2) of bytes.

7. The method of claim 1, wherein said portion of said first hash output (H1) comprises the entire hash output (H1).

8. The method of claim 1, wherein said performing said operation relating said first source data (S1) with said first hash output (H1) comprises XORing said first source data (S1) and said first hash output (H1) to form S1 XOR H1 as said second source data (S2).

9. The method of claim 1, wherein said performing said operation relating said first source data (S1) with said first hash output (H1) comprises concatenating said first source data (S1) with said first hash output (H1) to form S1H1 as said second source data (S2).

10. The method of claim 1, further comprising:
    providing at least one support service for at least one of creating, integrating, hosting, maintaining, and deploying computer-readable code in said computing system, wherein the code in combination with the computing system is capable of performing: said receiving, said first applying, said generating said first hash output (H1), said performing, said second applying, and said generating said second hash output (H2).

11. A computing system comprising a processor and a computer readable memory unit coupled to the processor, said memory unit containing instructions that when executed by the processor implement a hashing method, said method comprising:
    receiving, by a computing system, first source data (S1);
    first applying, by said computing system, a first hash function to said first source data (S1);
    generating as a result of said first applying, by said first hash function, a first hash output (H1);
    performing, by said computing system, an operation relating, said first source data (S1) with at least a portion of said first hash output (H1) to generate second source data (S2);
    second applying, by said computing system, said first hash function to said second source data (S2); and
    generating as a result of said second applying, by said first hash function, a second hash output (H2).

12. The computing system of claim 11, wherein said method further comprises:
    determining a numerical value (N1) for a first byte of said first hash output (H1); and
    determining a total number (N2) of bytes in said first source data (S1).

13. The computing system of claim 12, wherein said method further comprises:
    calculating, by said computing system, a remainder (R), wherein said remainder (R)=N1 mod N2.

14. The computing system of claim 13, wherein said method further comprises:
    combining, by said computing system, said first hash output (H1) with a number (N3) of zeros equivalent to a value of said remainder (R) such that said first hash output (H1) comprises said zeros; and
    second comparing said total number (N2) of bytes of said first source data (S1) with a number (N4) of bytes comprised by said first hash output (H1) comprising said zeros to determine if said total number (N2) of bytes is greater than said number (N4) of bytes.

15. The computing system of claim 14, wherein said second comparing determines that said number (N4) of bytes is greater than said total number (N2) of bytes, and wherein said method further comprises:
    removing, by said computing system, at least one byte of said first hash output (H1) such that first hash output (H1) does not comprise said at least one byte of said first hash output (H1).

16. The computing system of claim 14, wherein said second comparing determines that said number (N4) of bytes is not greater than said total number (N2) of bytes.

17. The computing system of claim 11, wherein said portion of said first hash output (H1) comprises the entire hash output (H1).

18. The computing system of claim 11, wherein said performing said operation relating said first source data (S1) with said first hash output (H1) comprises XORing said first source data (S1) and said first hash output (H1) to form S1 XOR H1 as said second source data (S2).

19. The computing system of claim 11, wherein said performing said operation relating said first source data (S1) with said first hash output (H1) comprises concatenating said first source data (S1) with said first hash output (H1) to form S1H1 as said second source data (S2).

20. A computer program product, comprising a computer readable memory medium having a computer readable program code embodied therein, said computer readable program code comprising an algorithm adapted to implement a hashing method within a computing system, said method comprising:
   receiving, by a computing system, first source data (S1);
   first applying, by said computing system, a first hash function to said first source data (S1);
   generating as a result of said first applying, by said first hash function, a first hash output (H1);
   performing, by said computing system, an operation relating, said first source data (S1) with at least a portion of said first hash output (H1) to generate second source data (S2);
   second applying, by said computing system, said first hash function to said second source data (S2); and
   generating as a result of said second applying, by said first hash function, a second hash output (H2).

21. The computer program product of claim 20, wherein said method further comprises:
   determining a numerical value (N1) for a first byte of said first hash output (H1); and
   determining a total number (N2) of bytes in said first source data (S1).

22. The computer program product of claim 21, wherein said method further comprises:
   calculating, by said computing system, a remainder (R), wherein said remainder (R)=N1 mod N2.

23. The computer program product of claim 22, wherein said method further comprises:
   combining, by said computing system, said first hash output (H1) with a number (N3) of zeros equivalent to a value of said remainder (R), wherein said first hash output (H1) additionally comprises said zeros; and
   second comparing said total number (N2) of bytes of said first source data (S1) with a number (N4) of bytes comprised by said first hash output (H1) comprising said zeros to determine if said total number (N2) of bytes is greater than said number (N4) of bytes.

24. The computer program product of claim 23, wherein said second comparing determines that said number (N4) of bytes is greater than said total number (N2) of bytes, and wherein said method further comprises:
   removing, by said computing system, at least one byte of said first hash output (H1) such that first hash output (H1) does not comprise said at least one byte of said first hash output (H1).

25. The computer program product of claim 23, wherein said second comparing determines that said number (N4) of bytes is not greater than said total number (N2) of bytes.

26. The computer program product of claim 20, wherein said portion of said first hash output (H1) comprises the entire hash output (H1).

27. The computer program product of claim 20, wherein said performing said operation relating said first source data (S1) with said first hash output (H1) comprises XORing said first source data (S1) and said first hash output (H1) to form S1 XOR H1 as said second source data (S2).

28. The computer program product of claim 20, wherein said performing said operation relating said first source data (S1) with said first hash output (H1) comprises concatenating said first source data (S1) with said first hash output (H1) to form S1H1 as said second source data (S2).

* * * * *